United States Patent
Wata et al.

(10) Patent No.: US 8,778,544 B2
(45) Date of Patent: Jul. 15, 2014

(54) BATTERY WITH TERMINAL

(75) Inventors: Toshie Wata, Osaka (JP); Tadayoshi Takahashi, Osaka (JP)

(73) Assignee: Panasonic Corporation, Osaka (JP)

( * ) Notice: Subject to any disclaimer, the term of this patent is extended or adjusted under 35 U.S.C. 154(b) by 70 days.

(21) Appl. No.: 13/704,558

(22) PCT Filed: Mar. 9, 2012

(86) PCT No.: PCT/JP2012/001637
§ 371 (c)(1),
(2), (4) Date: Dec. 14, 2012

(87) PCT Pub. No.: WO2012/120895
PCT Pub. Date: Sep. 13, 2012

(65) Prior Publication Data
US 2013/0089776 A1   Apr. 11, 2013

(30) Foreign Application Priority Data
Mar. 9, 2011  (JP) ................... 2011-051198

(51) Int. Cl.
  *H01M 6/16*   (2006.01)
  *H01M 2/02*   (2006.01)

(52) U.S. Cl.
  USPC .......................................... 429/338; 429/179

(58) Field of Classification Search
  CPC ..... H01M 6/18; H01M 6/16; H01M 10/0562; H01M 4/13; H01M 4/58
  USPC ....................... 429/330, 331, 338, 342, 231.5
  See application file for complete search history.

(56) References Cited

U.S. PATENT DOCUMENTS

| | | | |
|---|---|---|---|
| 2004/0151987 A1* | 8/2004 | Kawase et al. | 429/338 |
| 2005/0019654 A1 | 1/2005 | Kishida | |
| 2006/0286449 A1 | 12/2006 | Kishida | |
| 2007/0281217 A1 | 12/2007 | Ihara et al. | |
| 2008/0076021 A1 | 3/2008 | Takahashi | |
| 2008/0085454 A1 | 4/2008 | Ihara et al. | |
| 2009/0068567 A1* | 3/2009 | Konishiike et al. | 429/338 |
| 2011/0159368 A1 | 6/2011 | Hirose et al. | |

FOREIGN PATENT DOCUMENTS

| | | |
|---|---|---|
| JP | 2004-319423 A | 11/2004 |
| JP | 2007-324103 A | 12/2007 |

(Continued)

OTHER PUBLICATIONS

International Search Report issued in International Patent Application No. PCT/JP2012/001637 dated Jun. 26, 2012.

*Primary Examiner* — Patrick Ryan
*Assistant Examiner* — Kiran Quraishi
(74) *Attorney, Agent, or Firm* — McDermott Will & Emery LLP

(57) ABSTRACT

Disclosed is a battery with terminal, including a power generating element and a housing can accommodating the power generating element. The power generating element includes a positive electrode, a negative electrode, a separator interposed between the positive electrode and the negative electrode, and a non-aqueous electrolyte. The negative electrode includes a material mixture including a negative electrode active material and a binder. The negative electrode active material contains an amorphous Si phase, and the binder includes a polyacrylic acid. The non-aqueous electrolyte includes a non-aqueous solvent, and a lithium salt dissolved in the non-aqueous solvent, and the non-aqueous solvent contains vinylethylene carbonate. The housing can has at least one lead terminal welded thereto. The molar ratio of the vinylethylene carbonate to the amorphous Si phase in the negative electrode active material is 0.09 to 0.17.

5 Claims, 2 Drawing Sheets

(56) References Cited

FOREIGN PATENT DOCUMENTS

| | | |
|---|---|---|
| JP | 2008-016422 A | 1/2008 |
| JP | 2008-204885 A | 9/2008 |
| JP | 2009-218191 A | 9/2009 |
| JP | 2010-080285 A | 4/2010 |
| JP | 2011-233497 A | 11/2011 |
| WO | WO-2006/049027 A1 | 5/2006 |

* cited by examiner

BATTERY WITH TERMINAL

RELATED APPLICATIONS

This application is the U.S. National Phase under 35 U.S.C. §371 of International Application No. PCT/JP2012/001637, filed on Mar. 9, 2012, which in turn claims the benefit of Japanese Application No. 2011-051198, filed on Mar. 9, 2011, the disclosures of which Applications are incorporated by reference herein.

TECHNICAL FIELD

The present invention relates to a battery with terminal which includes a negative electrode active material containing an amorphous Si phase with high energy density.

BACKGROUND ART

Non-aqueous electrolyte batteries are widely used as the main power source or memory backup power source for various electronic devices. With recent spread of small portable devices such as cellular phones and digital still cameras, there has been ever-growing demand for non-aqueous electrolyte batteries. Moreover, the devices become smaller in size and lighter in weight, and on the other hand, they are required to have more sophisticated functions and tend to have a larger memory capacity. Accordingly, there is a growing demand for the main power source and the backup power source to be small in size and have a high capacity. Under these circumstances, examinations are being made to use a material with high energy density, such as silicon (Si) or tin (Sn), as a battery reaction active material. In particular, silicon, which can be alloyed with lithium until the composition becomes $Li_{4.4}Si$ and has a theoretical capacity of as high as 4199 mAh/g, is regarded as promising for providing a battery having a high capacity.

On the other hand, various studies have been made on the improvement of the charge/discharge cycle characteristics and low-temperature discharge characteristics of non-aqueous electrolyte batteries with higher capacity. For example, silicon becomes active when it absorbs lithium, and is apt to induce a side reaction of the non-aqueous electrolyte. In order to solve this problem, one proposal suggests that an acylated cyclic carboxylic acid ester compound be included in the battery, to inhibit the decomposition reaction of the carbonic acid ester contained in the non-aqueous electrolyte, and thereby to improve the charge/discharge cycle characteristics (Patent Literature 1). Another proposal suggests that fluoroethylene carbonate be contained in a specific ratio in a non-aqueous electrolyte containing a carbonic acid ester, thereby to suppress the swelling of the battery due to decomposition of the non-aqueous electrolyte (Patent Literature 2).

CITATION LIST

Patent Literature

[PTL 1] Japanese Laid-Open Patent Publication No. 2009-218191
[PTL 2] Japanese Laid-Open Patent Publication No. 2008-16422

SUMMARY OF INVENTION

Technical Problem

Among non-aqueous electrolyte batteries which include silicon as a reaction active material, a battery with terminal used by being mounted on a circuit board or the like sometimes exhibits significant deterioration in charge/discharge cycle characteristics. This is presumably because the negative electrode mainly composed of a silicon-containing active material becomes active due to the heat of welding. For example, in the case where a metal strip is welded as a lead terminal onto a flat surface of a coin battery, a part of the electrode disposed so as to face said flat surface is locally exposed to high temperatures, and the negative electrode mainly composed of a silicon-containing active material exothermically reacts with the non-aqueous electrolyte, causing a sharp increase in temperature. Presumably, as a result, the binder for bonding together the particles constituting the negative electrode is decomposed.

There have been many proposals, including Patent Literatures 1 and 2, that suggest how to suppress the decomposition of the non-aqueous electrolyte during normal use of the battery; however, there has been no effective proposal that suggests how to inhibit a side reaction which may occur due to the temporal exposure to abnormally high temperatures during welding of a lead terminal to the battery.

Welding of a lead terminal to the battery is performed by resistance welding or laser welding. In either welding method, when welding a lead terminal to the battery, it is necessary to thermally fuse the housing can of the battery and the terminal in a very small area. At this time, although the fused area is very small, the interior of the battery are exposed to considerably high temperatures, which may possibly induce an exothermic reaction involving an active material.

Silicon has a high energy density, and thus becomes highly active to heat. As such, the exothermic reaction to be induced is vigorous, and the side reaction may occur successively from one place to another throughout the electrode. As a result, the binder would be partially decomposed, and the electrode would deteriorate. Immediately after the welding of a lead terminal, no change in static characteristics (e.g., an increase in internal resistance) due to such deterioration is observed in many cases, and for the first time when the battery is used, the characteristics are sometimes found to have deteriorated.

Solution to Problem

The present invention intends to provide a battery with terminal including a negative electrode active material containing an amorphous Si phase with high energy density, and having a favorable long-term reliability after welding of a lead terminal.

One aspect of the present invention relates to a battery with terminal, including a power generating element and a housing can accommodating the power generating element. The power generating element includes a positive electrode, a negative electrode, a separator interposed between the positive electrode and the negative electrode, and a non-aqueous electrolyte. The negative electrode includes a material mixture including a negative electrode active material and a binder. The negative electrode active material contains an amorphous Si phase, and the binder includes a polyacrylic acid. The non-aqueous electrolyte includes a non-aqueous solvent, and a lithium salt dissolved in the non-aqueous solvent, and the non-aqueous solvent contains vinylethylene carbonate. The housing can has at least one lead terminal welded thereto. The molar ratio of the vinylethylene carbonate to the amorphous Si phase in the negative electrode active material is 0.09 to 0.17.

Another aspect of the present invention relates to a battery with terminal, including a power generating element and a housing can accommodating the power generating element. The power generating element includes a positive electrode, a negative electrode, a separator interposed between the positive electrode and the negative electrode, and a non-aqueous electrolyte. The negative electrode includes a material mixture including a negative electrode active material and a binder. The negative electrode active material contains an amorphous Si phase, and the binder includes a polyacrylic acid. The non-aqueous electrolyte includes a non-aqueous solvent, and a lithium salt dissolved in the non-aqueous solvent, the non-aqueous solvent containing vinylethylene carbonate. The housing can has at least one lead terminal welded thereto. Ninety percent or more of the interface between the amorphous Si phase and the non-aqueous electrolyte is coated with a surface film including a component produced by decomposition of the vinylethylene carbonate.

Advantageous Effects of Invention

According to the present invention, it is possible to impart favorable long-term storage reliability to a battery with terminal which includes a negative electrode active material containing an amorphous Si phase, and a housing can having a lead terminal welded thereto.

DESCRIPTION OF EMBODIMENT

Figure 1:
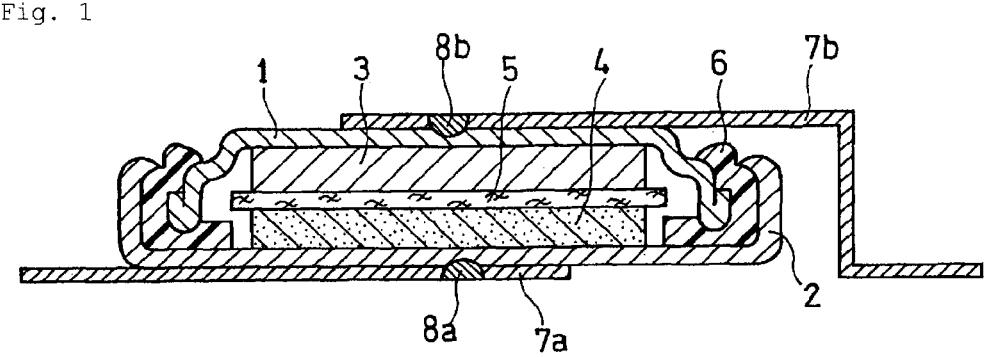
FIG. 1 A cross-sectional view of a coin battery with terminal according to one embodiment of the present invention FIG. 2 A characteristic diagram showing a result of a differential scanning calorimetry of a negative electrode including a non-aqueous electrolyte that does not contain vinylethylene carbonate FIG. 3 A characteristic diagram showing a result of a differential scanning calorimetry of a negative electrode according to the present invention

A battery with terminal according to the present invention includes a power generating element, a housing can accommodating the power generating element, and a lead terminal welded to the housing can. The power generating element and the housing can accommodating the power generating element constitute a sealed battery. The shape of the sealed battery is, for example, a coin shape, a tubular shape, or a chip shape, but not limited thereto. The lead terminal is constituted of a plate-like member made of a conductive material (e.g., a metal strip), and has a fixed end to be welded to the housing can of the battery, and a fee end. The free end functions, for example, as a contact terminal to be soldered when fixed onto a circuit board or the like. In the case where the battery is of a coin shape, the housing can includes a positive electrode can and a negative electrode can that fit with each other to form a space for accommodating the power generating element therein. To each of the positive and negative electrode cans, the lead terminal may be fixed by welding.

The power generating element includes a positive electrode, a negative electrode, a separator interposed therebetween, and a non-aqueous electrolyte. The positive electrode and the negative electrode are arranged so as to face each other with the separator interposed therebetween. The positive and negative electrodes are each formed of a material mixture (a mixture) including a positive electrode active material or a negative electrode active material. The material mixture is, for example, compression molded into a predetermined shape (e.g., a pellet), and the resultant molded product is used as the electrode. Alternatively, the material mixture may be dispersed into a liquid component to prepare a slurry, followed by application of the slurry onto a current collector, drying and rolling the applied film, whereby an electrode having a material mixture layer may be formed.

The negative electrode includes a material mixture including a negative electrode active material which contains Si, and a binder. The Si-containing negative electrode active material contains an amorphous Si phase; the binder includes a polyacrylic acid; and the non-aqueous electrolyte includes a non-aqueous solvent, and a lithium salt dissolved in the non-aqueous solvent. The non-aqueous solvent contains vinylethylene carbonate, and the molar ratio of the vinylethylene carbonate to the amorphous Si phase in the negative electrode active material is controlled to be 0.09 to 0.17.

<Negative Electrode>

The configuration of the negative electrode is described in more details below.

The material mixture of the negative electrode includes a Si-containing negative electrode active material and a binder, and the Si-containing negative electrode active material contains an amorphous Si phase which is electrochemically active. The amorphous Si phase is capable of electrochemically absorbing and releasing lithium. The binder includes a polyacrylic acid. Because of its excellent bonding property, a polyacrylic acid can be suitably used as a binder for a Si-containing negative electrode active material which expands and contracts greatly in association with charge and discharge. The presence of the binder allows the material mixture including a negative electrode active material and a binder to be molded into a negative electrode having a predetermined shape. If the binder is deteriorated or decomposed, the negative electrode cannot be in the predetermined shape, and the current collecting ability thereof lowers, resulting in deterioration in the charge/discharge characteristics. The negative electrode may further include a conductive agent, in addition to the active material and binder.

Since the negative electrode contains an amorphous Si phase having a comparatively large irreversible capacity, lithium may be absorbed beforehand into the negative electrode, prior to the fabrication of a battery. Lithium may be alloyed with an active material containing an amorphous Si phase by any method without limitation, and for example, a lithium foil is brought into press contact with the surface of the negative electrode, and in this state, the negative electrode and the lithium foil are allowed to contact with the non-aqueous electrolyte, whereby lithium can be electrochemically absorbed into the negative electrode active material.

(Binder)

The polyacrylic acid may be crosslinked or non-crosslinked. The weight average molecular weight of non-crosslinked polyacrylic acid is preferably 300,000 to 3,000,000 in order to achieve a high level of bonding property, and is more preferably 500,000 to 2,000,000 in view of the bonding strength and the dispersibility in the material mixture. The content of the polyacrylic acid in the material mixture is preferably 4 to 15 mass %. When the content is within this range, a negative electrode with high energy density can be obtained, and a good bonding property can be achieved.

(Conductive Agent)

A preferred conductive agent for a negative electrode is a carbon material. For example, graphites, carbon blacks, and carbon fibers may be used. These may be used singly or in combination of two or more. In view of achieving a high conductivity, graphites, which are not bulky, are preferred. The content of the conductive agent in the material mixture is preferably 15 to 23 mass %. When the content is within this range, a negative electrode with high energy density can be obtained, and a good conductivity can be achieved.

(Active Material)

The negative electrode active material may be Si simple substance, or a Si-containing alloy or oxide. Among them, a Si-containing alloy is preferred because of its excellent conductivity.

The Si-containing alloy may be an alloy of Si and a transition metal, such as Ti—Si alloy, Ni—Si alloy, W—Si alloy, or Co—Si alloy. In these alloys, an amorphous Si phase being electrochemically active may be co-present with an electrochemically inactive phase. The inactive phase functions to reduce the stress of expansion and contraction of the amorphous Si phase during charge and discharge, as well as to impart the conductivity to the negative electrode active material.

Among the above-listed alloys, Ti—Si alloy is particularly preferred because of its excellent conductivity. The mass ratio of Ti:Si in the Ti—Si alloy is preferably 30:70 to 45:55, in view of ensuring the capacity and sufficiently achieving the effects to reduce the stress and impart the conductivity.

The Si phase being an active phase needs to be amorphous. If a crystalline Si is used as the negative electrode active material, Si tends to be crushed due to the stress generated during charge and discharge. The crush, if any, may lower the current collecting ability of the negative electrode, or make the negative electrode difficult to maintain its shape. However, using an amorphous phase of Si can suppress the crush.

It is possible to confirm that Si is amorphous by, for example, analyzing an X-ray diffraction pattern of the negative electrode active material. Specifically, an X-ray diffraction pattern of the negative electrode active material is obtained by a wide-angle X-ray diffractometry, and using the half-width of the peak attributed to a crystal plane of the Si phase, the crystallite size is calculated from the Scherrer formula. If the calculated crystallite size is equal to or less than 30 nm, the Si phase can be judged as amorphous.

The Si phase having been alloyed with a transition metal such as Ti and made amorphous is homogeneous, since the crystallite size thereof is controlled to be, for example, equal to or less than 30 nm. Therefore, the necessary amount of VEC for coating the amorphous Si is greatly dependent on the number of moles of Si, rather than the particle diameter of the alloy.

The maximum particle size of a Si-containing alloy is preferably equal to or less than 100 μm, in view of ensuring the pellet shape in a favorable condition. The average particle diameter (D50) in a volumetric particle size distribution may be any value within the range of, for example, 1 μm to 50 μm.

The production method of an alloy containing an amorphous Si phase is not particularly limited, and may be selected as appropriate from mechanical alloying, vacuum vapor deposition, plating, chemical vapor deposition, liquid quenching, and ion beam sputtering. Among these methods, mechanical alloying is preferred because, for example, it is easy to form an amorphous phase and can inhibit the segregation of the alloy component.

In mechanical alloying, for example, a raw material of silicon (e.g., silicon simple substance) is mixed with a raw material of a transition metal (e.g., Ti simple substance) in a predetermined ratio, followed by stirring the resultant mixture while applying a mechanical shearing force thereto. Alternatively, an alloy of Si and a transition metal is synthesized beforehand by another method such as fusion, and the resultant alloy is crushed, followed by stirring the crushed alloy while applying a mechanical shearing force thereto. Stirring may be performed using, for example, a vibratory ball mill or bead mill.

<Non-Aqueous Electrolyte>

The non-aqueous electrolyte includes a non-aqueous solvent, and a lithium salt (supporting electrolyte) dissolved in the non-aqueous solvent.

The non-aqueous solvent is preferably mainly composed of, for example: a carbonic acid ester, such as propylene carbonate, ethylene carbonate, butylene carbonate, dimethyl carbonate, or diethyl carbonate; an ether, such as dimethoxyethane or diethoxyethane; or a cyclic carboxylic acid ester, such as γ-butyl lactone. Generally, 10 mass % or more of the non-aqueous solvent is at least one selected from carbonic acid esters, ethers, and cyclic carboxylic acid esters. Other than the above, for example, tetraglyme, sulfolane, tetrahydrofuran, and dioxolane may be used for the non-aqueous solvent.

The solvent components as listed above may be used singly, but in many cases, are preferably used as a mixture of two or more. Generally, a mixture of a high dielectric constant component and a low viscosity component is used. In a battery with terminal in which the negative electrode active material contains an amorphous Si phase, and the binder includes a polyacrylic acid, 10 mass % or more of the non-aqueous solvent is preferably at least one selected from the group consisting of propylene carbonate, ethylene carbonate, and dimethoxyethane, and is more preferably a mixture of three components: propylene carbonate, ethylene carbonate, and dimethoxyethane. These solvent components are comparatively stable against an amorphous Si phase and polyacrylic acid, and are expected to provide favorable characteristics. It suffices if the mass ratio of each component in a mixture of three components: propylene carbonate, ethylene carbonate, and dimethoxyethane, is, for example, 10 to 50 mass %.

It is to be noted that, in order to enhance the long-term reliability of the battery with terminal, the non-aqueous solvent should contain vinylethylene carbonate (VEC) at least. VEC decomposes on the surface of the negative electrode active material, and forms a chemically stable surface film thereon. Furthermore, in the battery with terminal, the amount of VEC to be added into the non-aqueous solvent should be controlled precisely depending on the amount of the amorphous Si phase contained in the negative electrode active material. Specifically, the molar ratio of VEC to the amorphous Si phase is controlled to 0.09 to 0.17.

Examples of the solute of the non-aqueous electrolyte include, without limitation, $LiN(CF_3SO_2)_2$, $LiN(C_2F_5SO_2)_2$, $LiN(CF_3SO_2)(C_4F_9SO_2)$, $LiCF_3SO_3$, $LiPF_6$, $LiBF_4$, and $LiClO_4$. These may be used singly or in combination of two or more.

The non-aqueous electrolyte may be in a gel state. A gel non-aqueous electrolyte can be obtained by allowing a liquid non-aqueous electrolyte to be retained in a polymer material. Examples of the polymer material include polyvinylidene fluoride, polyacrylonitrile, polyethylene oxide, polyvinyl chloride, polyacrylate, and vinylidene fluoride-hexafluoropropylene copolymer.

The foregoing features allows for formation of a surface film derived from VEC over almost the entire interface between the amorphous Si phase contained in the negative electrode active material and the non-aqueous electrolyte, specifically, 90% or more of the interface between the amorphous Si phase and the non-aqueous electrolyte. The surface film contains a component produced by the reductive decomposition of VEC. Said surface film is considered to have an effect to inhibit the exothermic reaction of the amorphous Si phase. This improves the capability of the negative electrode to withstand the thermal load associated with welding of a lead terminal to the battery, and also improves the charge/discharge cycle characteristics of the battery with terminal.

<DSC Characteristics>

Figure 2:
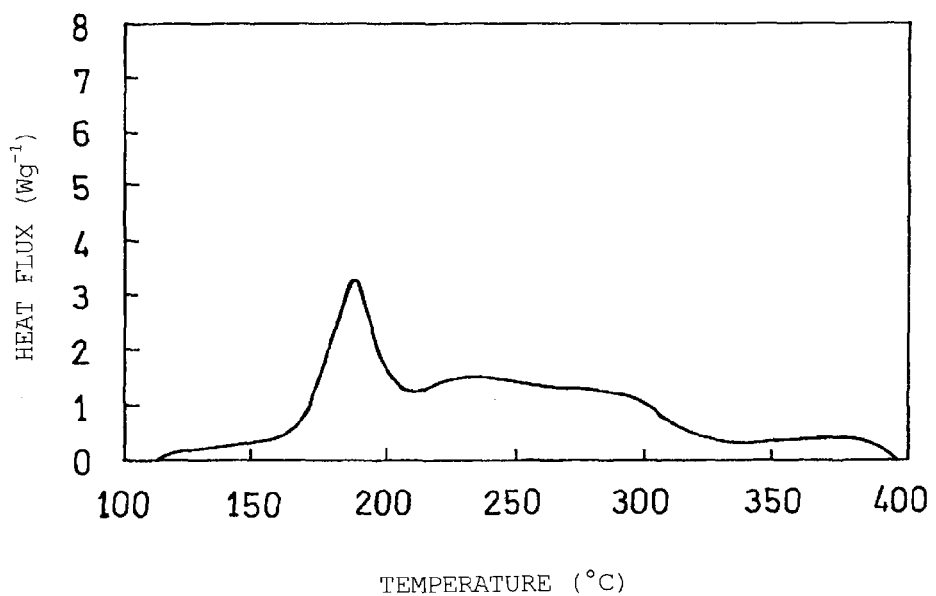

Next, description is given of a characteristic diagram obtained by subjecting the negative electrode to a differential scanning calorimetry. FIG. 2 shows a result of a differential scanning calorimetry (hereinafter, "DSC measurement") of the negative electrode, in the case of using a non-aqueous electrolyte not containing vinylethylene carbonate. In this measurement, the battery with terminal as a final product was disassembled, to take out the negative electrode therefrom. The negative electrode was then exposed to temperatures elevated up to 400° C. at a scanning rate of 10° C./min, during which the change in heat flux was measured. FIG. 2 shows that, in the case where the non-aqueous electrolyte does not contain VEC, the exothermic peak of the negative electrode appears at a temperature below 200° C., specifically around 180 to 190° C. A sharp increase in temperature of the negative electrode is considered to occur depending on whether or not the negative electrode reaches this temperature range (threshold).

Although the details are unclear, the negative electrode reaches the threshold temperature on rare occasion, due to the thermal load associated with welding of a lead terminal. In such an occasion, a vigorous exothermic reaction will occur in negative electrode, causing a sharp increase in temperature. The negative electrode temperature will then reach a decomposition temperature of the polyacrylic acid, i.e., 200° C. or more, which could cause decomposition of the polyacrylic acid. Once the polyacrylic acid is decomposed, the function thereof as a binder degrades. In the worst case, the polyacrylic acid might disappear. Therefore, during the use of the battery after welding of a lead terminal, the battery characteristics such as charge/discharge characteristics may deteriorate significantly.

Figure 3:
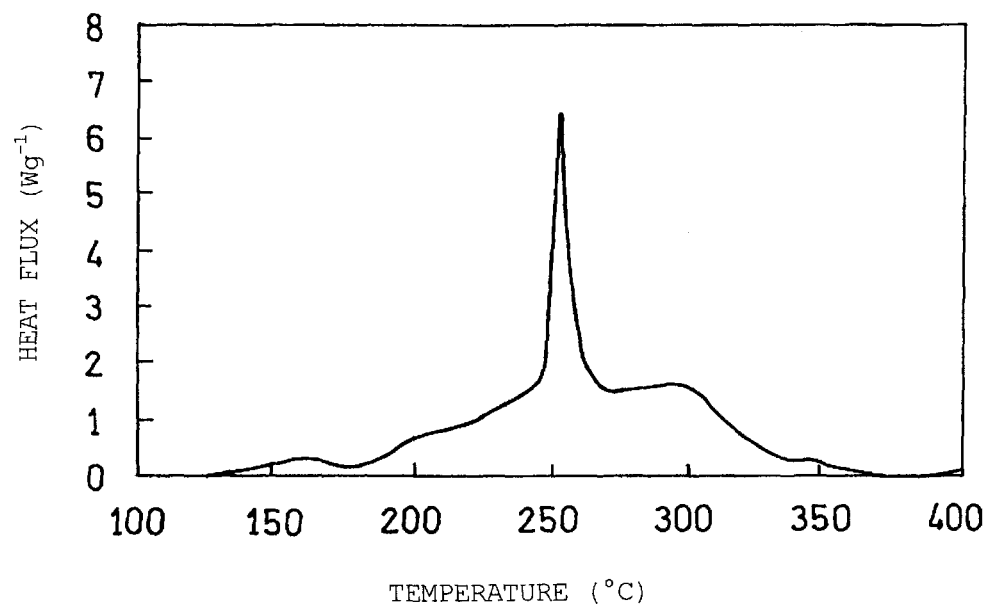

FIG. 3 shows a result of a DSC measurement of the negative electrode, in the case of using a non-aqueous electrolyte containing VEC. In this measurement also, the battery with terminal as a final product was disassembled, to take out the negative electrode therefrom. The negative electrode was then exposed to temperatures elevated up to 400° C. at a scanning rate of 10° C./min, during which the change in heat flux was measured. In FIG. 3, the exothermic peak appears at a temperature above 250° C. This is presumably because the negative electrode was coated with a surface film derived from VEC, and the exothermic reaction that could otherwise occur at a temperature around 180 to 190° C. as observed in FIG. 2 was inhibited. It is considered that, by inhibiting the exothermic reaction at a temperature around 180 to 190° C., the occurrence of a sharp increase in temperature of the negative electrode during welding of a lead terminal is prevented, the decomposition of the polyacrylic acid is prevented, and the performance of the negative electrode is maintained. Therefore, even a battery after welding of a lead terminal can have favorable charge/discharge cycle characteristics.

It is to be noted that the molar ratio of VEC to the amorphous Si phase contained in the negative electrode active material should be controlled to 0.09 to 0.17. In the case where the non-aqueous electrolyte contains VEC in a ratio falling outside the above range, favorable battery characteristics cannot be obtained.

Specifically, when the molar ratio of VEC to the amorphous Si phase is below 0.09, the amount of VEC relative to that of the amorphous Si phase becomes insufficient, and it becomes difficult to coat the amorphous Si phase almost entirely with a surface film derived from VEC. If the thermal load associated with welding of a lead terminal is applied to the portion of the negative electrode not coated with the surface film, a vigorous exothermic reaction may occur. As a result, a sharp increase in temperature of the negative electrode would occur, and the polyacrylic acid would be decomposed, causing the performance of the negative electrode to degrade.

On the other hand, when the molar ratio of VEC to the amorphous Si phase is above 0.17, the amount of components other than VEC in the non-aqueous electrolyte which have influence on the battery reaction becomes relatively small, and the impact thereof will remarkably appear on the battery characteristics. In welding a lead terminal, not only the negative electrode but also the positive electrode and the like react with the non-aqueous electrolyte, and the latter reactions also consume the non-aqueous electrolyte. As such, even though no deterioration is detected in the internal resistance upon welding, it could happen that the long-term characteristics such as storage characteristics deteriorate more severely, as compared with those of a battery without a lead terminal welded thereto.

Embodiment 1

FIG. 1 is a cross-sectional view of a coin-shaped lithium secondary battery with terminal according to one embodiment of the present invention. This battery includes a power generating element comprising: a positive electrode 4 including a positive electrode active material, a conductive agent, and a binder; a negative electrode 3 as mentioned above including a negative electrode active material containing an amorphous Si phase, a conductive agent, and a binder; a separator 5 interposed between the positive electrode 4 and the negative electrode 3; and a non-aqueous electrolyte (not shown) containing VEC. The power generating element is accommodated in the space formed between a battery case (positive electrode can) 2 and a sealing plate (negative electrode can) 1, while being pressed in its stacking direction by the battery case (positive electrode can) 2 and the sealing plate (negative electrode can) 1.

The sealing plate (negative electrode can) 1 is provided with a resin gasket 6 annularly formed by ejection molding along the opening thereof. In fabricating a battery, the sealing plate 1 is fitted to the battery case (positive electrode can) 2, with the gasket 6 interposed therebetween. Subsequently, the opening end of the battery case 2 is clamped inwardly, to hermetically seal the battery. Thereafter, a positive electrode lead terminal 7a and a negative electrode lead terminal 7b are thermally fused to the positive electrode can 2 and the negative electrode can 1, respectively, by resistance welding or laser welding, forming fixing ends 8a and 8b as a welding point between the housing can and each lead terminal.

The positive electrode can, negative electrode can, positive electrode lead terminal, negative electrode lead terminal may be made of, for example, a metal material such as stainless steel.

The positive electrode active material included in positive electrode 4 is not particularly limited and may be any material that is capable of electrochemically absorbing and releasing lithium and functioning as a positive electrode when combined with a negative electrode active material containing Si. Examples of such material include: composite oxides, such as $LiMnO_2$, $LiMn_2O_4$, $Li_4Mn_5O_{12}$, $LiMn_4O_9$, $MnO_2$, $LiCoO_2$, LiNiO$_2$, V$_2$O$_5$, V$_6$O$_{13}$, WO$_3$, Nb$_2$O$_5$, and Li$_{4/3}$Ti$_{5/3}$O$_4$; and conductive polymers. These may be used singly or in combination of two or more.

The conductive agent included in the positive electrode 4 is not particularly limited and may be any electron conductive material that is chemically stable within the potential range within which the battery is charged and discharged. Examples of such material include graphites, carbon blacks, and carbon fibers. These may be used singly or in combination of two or more.

The binder included in the positive electrode 4 is not particularly limited and may be, for example: a polyolefin, such as polyethylene or polypropylene; a fluorinated resin, such as polytetrafluoroethylene (PTFE), polyvinylidene fluoride (PVdF), or tetrafluoroethylene-hexafluoropropylene copolymer; a styrene butadiene rubber; or an acrylic acid-methacrylic acid copolymer.

The separator 5 may be made of a non-woven fabric or microporous film made of resin. For example, these porous materials are punched into a circular shape and used as the separator.

EXAMPLES

A battery with terminal of Embodiment 1 was fabricated in the following manner.
(1) Examination of Molar Ratio of VEC to Amorphous Si Phase
(Production of Negative Electrode)

A Ti35-Si65 alloy having a Ti:Si mass ratio of 35:65 was formed as a negative electrode active material. Specifically, Ti and Si were fed into a vibratory ball mill in the above mass ratio, and stainless steel balls of 15 mm in diameter were further fed thereinto, to alloy Si with Ti by mechanical alloying. The atmosphere in the mill was replaced with argon, and maintained at 1 atm. The vibratory ball mill was driven under the conditions that the amplitude was 8 mm, and the number of revolutions was 1200 rpm. Under these conditions, mechanical alloying was performed for 80 hours. The obtained Ti—Si alloy powder was classified to obtain particles of 100 μm or less in size, which were used as a negative electrode active material. The crystallite size of the resultant Ti—Si alloy was checked and it was equal to or less than 30 nm. The ratio of the amorphous Si phase in the Ti—Si alloy was calculated and it was 24 mass %.

A non-crosslinked polyacrylic acid having a weight average molecular weight of 1,000,000 was used as a binder. Specifically, an aqueous solution of a non-crosslinked polyacrylic acid (available from Toagosei Co., Ltd.) was used.

Graphite having a mean particle diameter (D50) of 10 μm (available from Nippon Graphite Industries Ltd.) was used as a conducive agent.

The Ti35-Si65 alloy serving as the negative electrode active material, the graphite serving as the conductive agent, and the non-crosslinked polyacrylic acid serving as the binder were blended such that the solid content mass ratio among them became 100:30:10, and kneaded, whereby a negative electrode material mixture was prepared. The obtained negative electrode material mixture was compression molded into a pellet of 4 mm in diameter and 0.38 mm in thickness, and the pellet was dried at 160° C. for 12 hours, which was used as a negative electrode 3.
(Production of Positive Electrode)

Lithium manganate was uses as a positive electrode active material. The lithium manganate was synthesized by mixing manganese dioxide and lithium hydroxide in a molar ratio of 2:1, and heating the resultant mixture at 400° C. for 12 hours.

The lithium manganate serving as the positive electrode active material, acetylene black serving as a conductive agent, and an aqueous dispersion of a fluorocarbon resin serving as a binder were blended such that the solid content mass ratio among them became 100:5:8, and kneaded, whereby a positive electrode material mixture was prepared. The obtained positive electrode material mixture was compression molded into a pellet of 4.1 mm in diameter and 1.2 mm in thickness, and the pellet was dried at 250° C. for 10 hours, which was used as a positive electrode 4.
(Preparation of Non-Aqueous Electrolyte)

A mixed solvent of propylene carbonate, ethylene carbonate, and dimethoxyethane in a volume ratio of 1:1:1 was used as a non-aqueous solvent. In the mixed solvent, LiN(CF$_3$SO$_2$)$_2$ was dissolved as a lithium salt (supporting electrolyte) at a concentration of 1 M, to which VEC was further added. A non-aqueous electrolyte was thus prepared.

The amount of VEC in the non-aqueous electrolyte was adjusted to 6.6 mass %. A predetermined amount of the non-aqueous electrolyte was injected into the battery such that the molar ratio of VEC to the amorphous Si phase became 0.12.
(Separator)

A polypropylene non-woven fabric was punched into a circular shape and used as a separator.
(Fabrication of Battery)

The negative electrode 3 and lithium were placed on the inner bottom surface of a shallow negative electrode can 1 with a polypropylene gasket 6 disposed around the periphery thereof, the separator 5 was placed on the negative electrode 3, and then, the non-aqueous electrolyte was injected into the negative electrode can 1, to allow lithium to be absorbed in the negative electrode. Thereafter, the positive electrode 4 was placed on the separator 5, and the opening of the negative electrode can 1 was closed with a shallow positive electrode can 2, to give a coin-shaped sealed battery.

The battery had a size of 6.8 mm in outer diameter and 2.1 mm in height.

The battery fabricated in the above production process was referred to as Battery A1.

With the amount of the VEC-containing non-aqueous electrolyte to be injected into the battery being set constant, Batteries A2 to A7 were fabricated in the same manner as in Battery A1, except that the amount of VEC in the non-aqueous electrolyte was changed to 1 mass %, 2.9 mass %, 4.8 mass %, 9.1 mass %, 10.7 mass %, or 12.3 mass % (i.e., the molar ratio of VEC to the amorphous Si phase was changed to 0.02, 0.06, 0.09, 0.17, 0.20, or 0.23).

A positive electrode lead terminal 7a and a negative electrode lead terminal 7b were fused to the central portions of the positive and negative electrode cans 2 and 1, respectively, by laser welding, to give Batteries B1 to B7 with terminal were produced.
(60° C. Storage Characteristics After Terminal Welding)

Ten batteries each from Batteries A1 to A7 and Batteries B1 to B7 were stored in a 60° C. environment for 100 days. The batteries were then taken out to check a discharge capacity, to determine a capacity retention rate (with the capacity before storage being taken as 100%). The discharge was performed through a resistance of 20 kΩ until the battery voltage reached 2.0 V.
(Charge/Discharge Cycle Characteristics)

Ten batteries each from Batteries A1 to A7 and Batteries B1 to B7 were subjected to charge/discharge cycles in a 20° C. environment under the following conditions. A capacity retention rate after 50 charge/discharge cycles was determined (with the capacity at the 1$^{st}$ cycle being taken as 100%). With regard to Batteries B1 to B7, battery which exhibited no increase in internal resistance after welding of the lead terminals 7a and 7b were evaluated. The conditions for charge and discharge are shown below.

Charge: 3.2 V, 2 kΩ, 60 hours
Discharge: 20 kΩ, 2.0 V cut-off

An average capacity retention rate after storage at 60° C. for 100 days, and an average capacity retention rate and minimum capacity retention rate after 50 charge/discharge cycles of each battery are shown in Table 1, together with particulars thereof.

It is to be noted that Batteries A1 to A7 are of Reference Example, Batteries B1, B4 and B5 are of Example, and Batteries B2, B3, B6 and B7 are of Comparative Example.

TABLE 1

| Battery | Molar ratio of VEC to amorphous Si phase | Lead terminal | Capacity retention rate after storage at 60° C. for 100 days (%) Average | Capacity retention rate after 50 charge/discharge cycles (%) Average | Minimum |
|---|---|---|---|---|---|
| A2 | 0.02 | Without | 80 | 89 | 87 |
| A3 | 0.06 | Without | 82 | 90 | 88 |
| A4 | 0.09 | Without | 83 | 90 | 88 |
| A1 | 0.12 | Without | 80 | 92 | 90 |
| A5 | 0.17 | Without | 81 | 91 | 88 |
| A6 | 0.20 | Without | 80 | 90 | 86 |
| A7 | 0.23 | Without | 83 | 89 | 84 |
| B2 | 0.02 | With | 84 | 40 | 0 |
| B3 | 0.06 | With | 81 | 60 | 1 |
| B4 | 0.09 | With | 80 | 91 | 88 |
| B1 | 0.12 | With | 82 | 92 | 89 |
| B5 | 0.17 | With | 82 | 92 | 88 |
| B6 | 0.20 | With | 60 | 90 | 85 |
| B7 | 0.23 | With | 36 | 90 | 82 |

Table 1 shows that when the molar ratio of VEC to the amorphous Si phase was equal to or more than 0.09 and equal to or less than 0.17, the capacity retention rate was still high even after storage at 60° C. for 100 days, and favorable charge/discharge cycle characteristics were obtained.

When the mole ratio of VEC to the amorphous Si phase was less than 0.09, the charge/discharge cycle characteristics remarkably degraded after welding of the lead terminals 7a and 7b. This is presumably because since the amount of VEC relative to that of the amorphous Si phase was insufficient, it was impossible to coat the amorphous Si phase almost entirely with a surface film derived from VEC, and the thermal load associated with welding of the lead terminal 7b was applied to the portion of the negative electrode 3 not coated with the surface film. Specifically, it is presumed that a vigorous exothermic reaction occurred in the negative electrode 3, and the temperature of the negative electrode 3 increased sharply to above 200° C., causing decomposition of the polyacrylic acid and thus deterioration of the negative electrode 3. As a consequence, the negative electrode 3 was crumbled due to the repetitive charge and discharge so severely that, in the worst case, it became almost impossible to charge and discharge the battery.

When the mole ratio of VEC to the amorphous Si phase was more than 0.17, the amount of components other than VEC in the non-aqueous electrolyte was relatively small. Presumably because of this, the consumption of the non-aqueous electrolyte due to the side reaction that occurred inside the battery during welding of the lead terminal had great influence, and the capacity deterioration during storage was accelerated.

INDUSTRIAL APPLICABILITY

The battery with terminal of the present invention has excellent storage characteristics and charge/discharge cycle characteristics, and therefore, can be used for various applications, such as main power applications and backup power applications.

REFERENCE SIGNS LIST

1: Sealing plate (negative electrode can), 2: Battery case (positive electrode can), 3: Negative electrode, 4: Positive electrode, 5: Separator, 6: Gasket, 7a, 7b: Lead terminal, 8a, 8b: Fixing end (welding point)

The invention claimed is:

1. A battery with terminal, comprising a power generating element and a housing can accommodating the power generating element,
the power generating element comprising a positive electrode, a negative electrode, a separator interposed between the positive electrode and the negative electrode, and a non-aqueous electrolyte, wherein:
the negative electrode includes a material mixture including a negative electrode active material and a binder;
the negative electrode active material contains an amorphous Si phase;
the binder includes a polyacrylic acid;
the non-aqueous electrolyte includes a non-aqueous solvent, and a lithium salt dissolved in the non-aqueous solvent, the non-aqueous solvent containing vinylethylene carbonate;
the housing can has at least one lead terminal welded thereto;
a molar ratio of the vinylethylene carbonate to the amorphous Si phase in the negative electrode active material is 0.09 to 0.17.

2. The battery with terminal according to claim 1, wherein the negative electrode active material is a Ti—Si alloy containing the amorphous Si phase.

3. The battery with terminal according to claim 1, wherein the polyacrylic acid is a non-crosslinked polyacrylic acid having a mass average molecular weight of 300,000 to 3,000,000.

4. The battery with terminal according to claim 1, wherein 10 mass % or more of the non-aqueous solvent is at least one selected from the group consisting of propylene carbonate, ethylene carbonate, and dimethoxyethane.

5. A battery with terminal, comprising a power generating element and a housing can accommodating the power generating element,
the power generating element comprises a positive electrode, a negative electrode, a separator interposed between the positive electrode and the negative electrode, and a non-aqueous electrolyte, wherein:
the negative electrode includes a material mixture including a negative electrode active material and a binder,
the negative electrode active material contains an amorphous Si phase,
the binder includes a polyacrylic acid;
the non-aqueous electrolyte includes a non-aqueous solvent, and a lithium salt dissolved in the non-aqueous solvent, the non-aqueous solvent containing vinylethylene carbonate;
the housing can has at least one lead terminal welded thereto;
90% or more of an interface between the amorphous Si phase and the non-aqueous electrolyte is coated with a surface film including a component produced by decomposition of the vinylethylene carbonate.

* * * * *